US010325380B2

(12) United States Patent
Thomas et al.

(10) Patent No.: US 10,325,380 B2
(45) Date of Patent: Jun. 18, 2019

(54) PRECISE, LOW-COST ORTHOPAEDIC SURGICAL SIMULATOR

(71) Applicant: University of Iowa Research Foundation, Iowa City, IA (US)

(72) Inventors: Geb W. Thomas, Iowa City, IA (US); Steven A. Long, Iowa City, IA (US); Donald D. Anderson, Iowa City, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 342 days.

(21) Appl. No.: 15/397,352

(22) Filed: Jan. 3, 2017

(65) Prior Publication Data
US 2017/0200399 A1   Jul. 13, 2017

Related U.S. Application Data

(60) Provisional application No. 62/277,668, filed on Jan. 12, 2016.

(51) Int. Cl.
*G09B 23/28* (2006.01)
*G06T 7/73* (2017.01)

(52) U.S. Cl.
CPC ............. *G06T 7/73* (2017.01); *G09B 23/285* (2013.01); *G06T 2207/10012* (2013.01); *G06T 2207/30008* (2013.01); *G06T 2207/30021* (2013.01); *G06T 2207/30204* (2013.01)

(58) Field of Classification Search
CPC . A61B 34/20; A61B 2034/2055; A61B 34/10; A61B 2034/105; G06T 2207/30008; G06T 2207/30021; G06T 2207/30204; G06T 7/73; G06T 2210/41; G09B 23/285; G09B 23/28
See application file for complete search history.

(56) References Cited

U.S. PATENT DOCUMENTS

| | | | |
|---|---|---|---|
| 4,106,219 A | 8/1978 | Schneider et al. | |
| 7,840,254 B2 * | 11/2010 | Glossop | A61B 90/96 600/424 |
| 8,021,162 B2 | 9/2011 | Sui | |
| 2002/0077543 A1 | 6/2002 | Grzeszczuk et al. | |
| 2004/0030245 A1 | 2/2004 | Noble et al. | |

(Continued)

*Primary Examiner* — Jerry-Daryl Fletcher
(74) *Attorney, Agent, or Firm* — Goodhue, Coleman & Owens, P.C

(57) ABSTRACT

An orthopaedic surgical simulator includes a bone (a simulated bone or cadaver bone). The simulator further includes a base, wherein the bone is operatively connected to the base, an optical system mounted proximate the base, wherein the optical system comprises at least one camera and provides a first view and a second view of an incision area associated with the bone. There are fiducial markers on a surgical wire to represent depth of the surgical wire when a tip of the surgical wire is not visible. The simulator further includes a computing device in operative communication with the camera and configured to track position of a surgical wire by determining position of the surgical wire using the fiducial markers on the surgical wire and to generate imagery based on a three-dimensional model of the bone and position of the surgical wire relative to the bone.

20 Claims, 8 Drawing Sheets

(56) References Cited

U.S. PATENT DOCUMENTS

2005/0058363 A1* 3/2005 Florent .................. G06T 5/002
                                                                         382/261
2005/0142525 A1   6/2005 Cotin et al.

\* cited by examiner

PRECISE, LOW-COST ORTHOPAEDIC SURGICAL SIMULATOR

PRIORITY STATEMENT

This application claims priority to U.S. Provisional Application No. 62/277,668, hereby incorporated by reference in its entirety.

GRANT REFERENCE

This invention was made with government support under Contract No. R18 HS022077 awarded by the Agency for Healthcare Research and Quality (AHRQ). The government has certain rights in the invention.

FIELD OF THE INVENTION

The present invention relates to surgical simulators. More particularly, but not exclusively, the present invention relates to a surgical simulator for training orthopaedic surgical residents and practicing orthopaedic surgeons.

BACKGROUND

One of the most essential skills to the practice of orthopaedic trauma surgery is drilling along a particular trajectory in a bone. In the operating room, drills are aligned with a fluoroscope, a portable X-ray machine. After making an incision, the surgeon positions the drill on the outer surface of the bone both by feeling the curve and landmark features of the bone with the drill tip and by looking through the incision. Then the surgeon orients the drill towards the target position by referring to fluoroscopic images, generally taken from two different directions. Training orthopaedic surgical residents or practicing orthopaedic surgeons to acquire or improve this skill is problematic. One approach to learning this skill is to practice on cadavers. Yet, practicing on cadavers is difficult because the radiography machines are large, expensive, and they expose workers and the environment to radiation. Also, they generally require a technician to operate the machine and technicians and machines are primarily scheduled for use in the operating room. In addition, cadaver parts themselves are relatively expensive. Although rubber and plastic models may be used instead, these models are also expensive.

Although surgical simulators exist, known systems may be prohibitively expensive, lack precision, or otherwise deficient thereby discouraging use. Consequently, rigorous practice is often neglected in favor of operating room experience. What is needed is the ability to practice surgical skills of wire navigation without cadaveric tissue or the need of a fluoroscope and which is relatively low cost.

SUMMARY

Therefore, it is a primary object, feature, or advantage of the present invention to improve over the state of the art.

It is a further object, feature, or advantage of the present invention to provide a system for training unfamiliar techniques, practicing known techniques, or experimenting with potential new techniques for orthopaedic surgeons and doctors training to become orthopaedic surgeons.

It is a still further object, feature, or advantage of the present invention to provide a convenient and inexpensive method for practicing the skill of drilling along a particular trajectory in a bone.

Another object, feature, or advantage of the present invention is to provide a means to practice drilling along a trajectory without requiring use of cadaveric tissue or the use fluoroscope.

Yet another object, feature, or advantage of the present invention is to provide a method of training that increases consistency and patient safety.

Yet another object, feature, or advantage of the present invention is to provide a means to demonstrate new surgical implants.

A further object, feature, or advantage of the present invention is to provide training that allows surgeons to better recognize the relationship between an imaging setup and their ability to precisely place a wire.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, an orthopaedic surgical simulator includes a bone, wherein the bone is a simulated bone or a cadaver bone. The simulator further includes a base, wherein the bone is operatively connected to the base. The simulator further includes an optical system mounted proximate the base, wherein the optical system comprises at least one camera and provides a first view and a second view of an incision area associated with the bone. There are fiducial markers on a surgical wire to represent depth of the surgical wire when a tip of the surgical wire is not visible. The simulator further includes a computing device in operative communication with the camera and configured to track position of a surgical wire by determining position of the surgical wire using the fiducial markers on the surgical wire and to generate imagery based on a three-dimensional model of the bone and position of the surgical wire relative to the bone.

According to another aspect, an orthopaedic surgical simulator includes a simulated bone, a material surrounding the simulated bone to simulate skin, a base, the simulated bone operatively connected to the base, and a camera mounted proximate the base. The surgical simulator further includes a series of mirrors to provide a first view and a second view of the simulated bone or material simulating skin to the camera and fiducial markers on a surgical wire to represent depth of the surgical wire when a tip of the surgical wire is not visible. The surgical simulator further includes a computing device in operative communication with the camera and configured to track position of a surgical wire by tracking edges of the surgical wire and determining position of the surgical wire using the fiducial markers on the surgical wire and to generate imagery based on a three-dimensional model of the simulated bone and position of the surgical wire relative to the simulated bone.

According to another aspect a method for simulating orthopaedic surgery is provided. The method includes providing an orthopaedic surgical simulator which may include a bone (the bone may be a simulated bone or cadaveric bone), base operatively connected to the bone, an optical system comprising a camera mounted proximate the base, the optical system providing a first view and a second view of an incision area associated with the simulated bone, fiducial markers on a surgical wire to represent depth of the surgical wire when a tip of the surgical wire is not visible; and a computing device in operative communication with the camera and configured to track position of a surgical wire and determine position of the surgical wire using the fiducial markers on the surgical wire and to generate imagery based on a three-dimensional model of the bone and position of the surgical wire relative to the bone. The method further includes acquiring at least two views of the bone (e.g. simulated bone or cadaveric bones) and a surgical wire. The method further includes processing an image representation of the views to determine three-dimensional position of the surgical wire and generating imagery based on the three-dimensional model of the bone and the position of the surgical wire relative to the bone.

According to another aspect, a method of demonstrating an orthopaedic implant using an orthopaedic surgical simulator is provided. The method includes providing the orthopaedic surgical simulator. The simulator may include an optical system comprising a camera mounted proximate the base, the optical system providing a first view and a second view of an incision area associated with or providing access to a bone, fiducial markers on a surgical wire to represent depth of the surgical wire when a tip of the surgical wire is not visible, and a computing device in operative communication with the camera and configured to track position of a surgical wire and determine position of the surgical wire using the fiducial markers on the surgical wire and to generate imagery based on a three-dimensional model of the bone and position of the surgical wire relative to the bone. The method may include acquiring the first view and the second view, processing an image representation of the first view and the second view to determine three-dimensional position of the surgical wire, and generating imagery based on the three-dimensional model of the bone and the position of the surgical wire relative to the simulated bone.

DETAILED DESCRIPTION

The precise, low-cost orthopaedic surgical simulator described herein facilitates practice drilling along a particular trajectory in a bone. This skill is essential to the practice of orthopaedic trauma surgery. This simulator will allow surgical residents and practicing surgeons a more convenient and inexpensive opportunity to practice this skill, improving training consistency and, thereby, patient safety.

Figure 1:
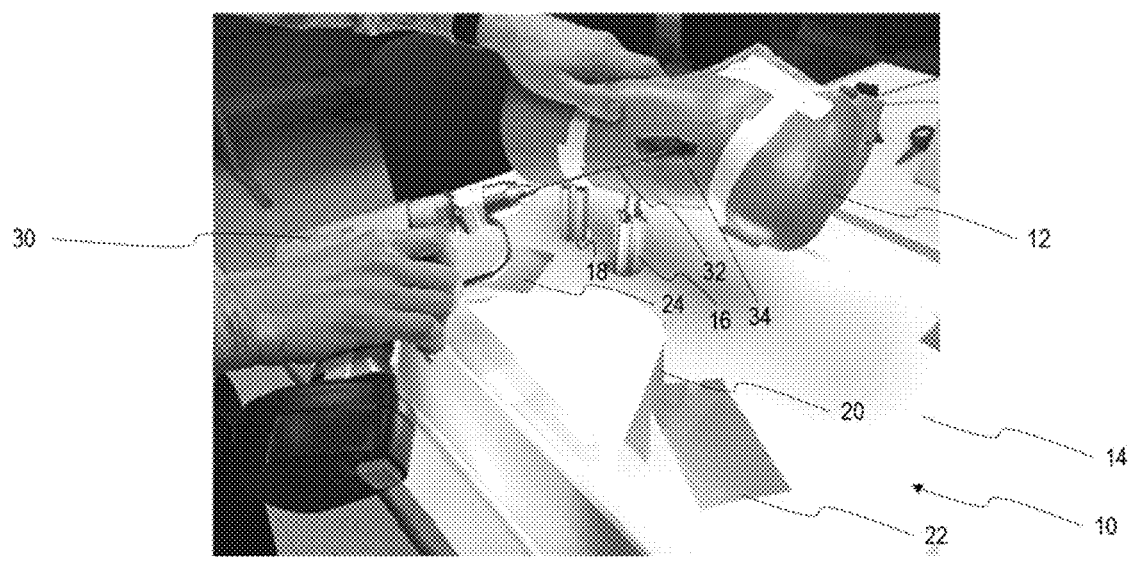
FIG. 1 illustrates the surgical simulator in use.

FIG. 1 illustrates one embodiment of a surgical simulator 10 in use. A block 12 is mounted above a platform surface or work surface 14 with stands or posts 16, 18. The block may be manufactured with a simulated soft skin exterior covering a hard plastic region to simulate the bone. The work surface 14 is preferably well-lit. The simulated soft skin exterior may be formed of a material such as rubber or other elastomer. The hard plastic region is shaped to contain the critical landmarks of the simulated anatomy. Different blocks can be designed to simulate different anatomical regions and to emphasize different surgical challenges. One example used throughout this description is that of a plastic femur. The femur and rubber simulate a patients outer hip, including the upper femur and femoral neck. The surgeon's task is to drill a wire through the incision that has been made in the rubber layer, into the femur, through the femoral neck, and into the tip apex of the femoral ball. The position of the blocks and the geometry they contain must be known in advance. Thus, it is contemplated that a single surgical simulator may be configured to work with a plurality of different blocks of known geometries positioned at a known location.

A light director 20 is shown which is generally triangular in shape and directs light upward towards the block 12. Apertures 22, 24 are shown which allow a single camera mounted below the work surface to see the underside of the wire 32 of the drill 30 from two different views. Mirrors underneath the apertures 22, 24 reflect the view seen through the apertures 22, 24. The dark lines on the wire 32 allow the depth of the wire to be calculated from the resulting images when the wire 32 is inserted into the opening or incision 34 and the tip of the wire 32 is not visible. The lines or markings may be annular markings around the wire 32. As shown, a trainee positions the surgical wire 32 in the incision 34 in the rubber so that the tip is against the plastic bone inside the rubber sheath. Thus, a single camera mounted below the base observes the work area in front of the hip, a region that the surgical wire must pass through before it enters the incision and plastic bone. Through a series of mirrors, two views of the underside of the region directly in front of the bone are brought into focus in a single image. Alternatively, multiple cameras may be used to provide multiple views. The camera(s) and mirror(s) form an optical system. The optical system includes at least one camera and provides a first view and a second view of the incision area associated with the bone.

Figure 2:
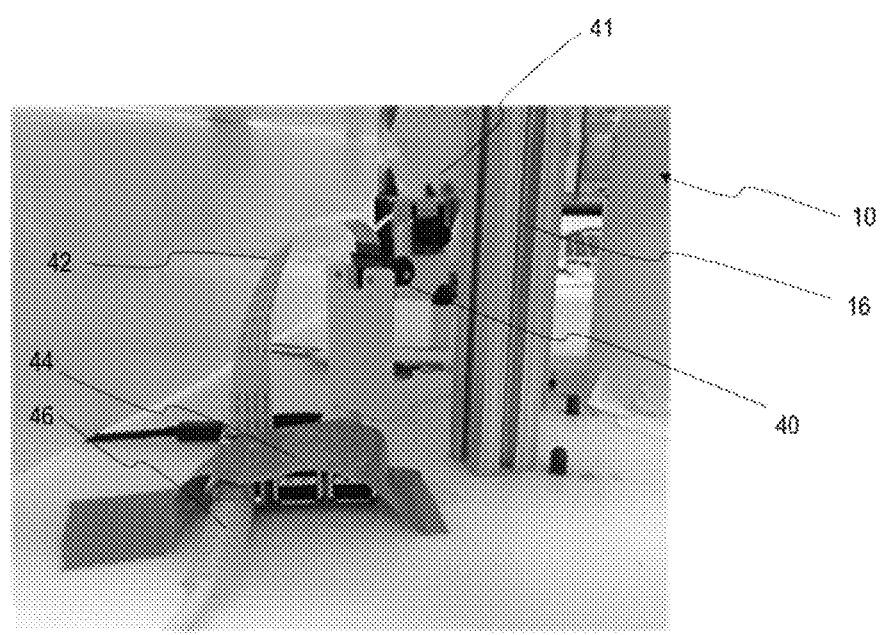
FIG. 2 illustrates the interior of the simulator showing the camera and the first mirror.

FIG. 2 shows the inside of simulator 10 near the back of the device. The camera 40 is mounted on the vertical, white plastic device to the left of the aluminum post 16. The white ribbon cable 42 from the camera 40 connects it to a computing device 44 such as a Raspberry Pi computer, which provides the images to the display computer a network connection 46 which may be provided through an Ethernet cable. The first of three reflecting mirrors 41 is visible between the camera 40 and the aluminum post 16 which shows a reflection including the camera 40.

Figure 3:
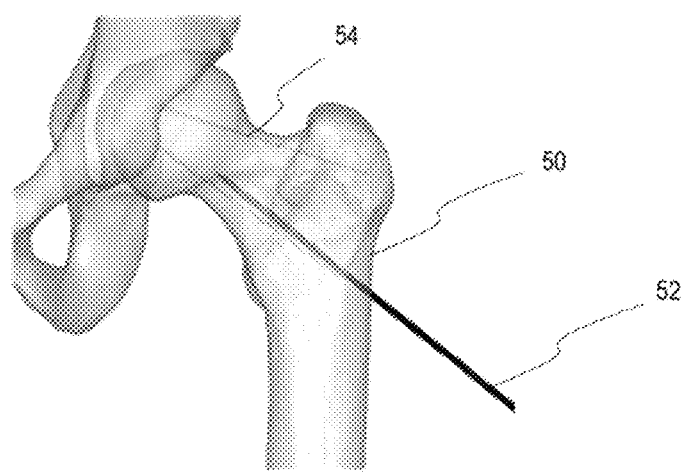
FIG. 3 is a sample antereoposterior image of the femoral neck showing the position of the wire.
Figure 4:
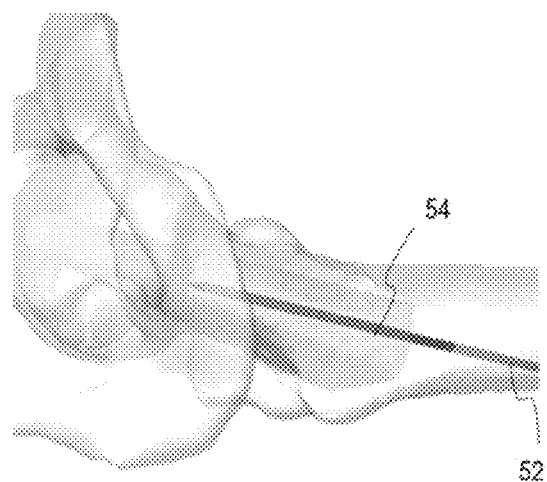
FIG. 4 is a sample lateral image of the femoral neck showing the position of the wire.

FIG. 3 illustrates an example of one of the two simulated radiographic images generated by the simulator. The image shows the outline of the upper femur 50 viewed in the anteroposterior (front-to-back) direction. The black, pointed wire 52 is shown in the correct position relative to the plastic bone. The region 54 which may be displayed in green shows acceptable approach directions, given current surgical practice. The wire must be within 24 mm of the tip apex, which lies on the outer edge of the round head, opposite the neck. Of course, complete understanding of the three-dimensional wire position cannot be realized from just one image, because one cannot judge the position of the wire 52 in the plane perpendicular to the image. Thus, the surgeon must also consider the information available in the lateral (sideways) image, illustrated in FIG. 4. Note that the system's computer graphics system generates images similar to the radiological images produced by a fluoroscope. It generates these images by rendering the tracked wire relative to a three-dimensional model of the bone geometry.

Figure 5:
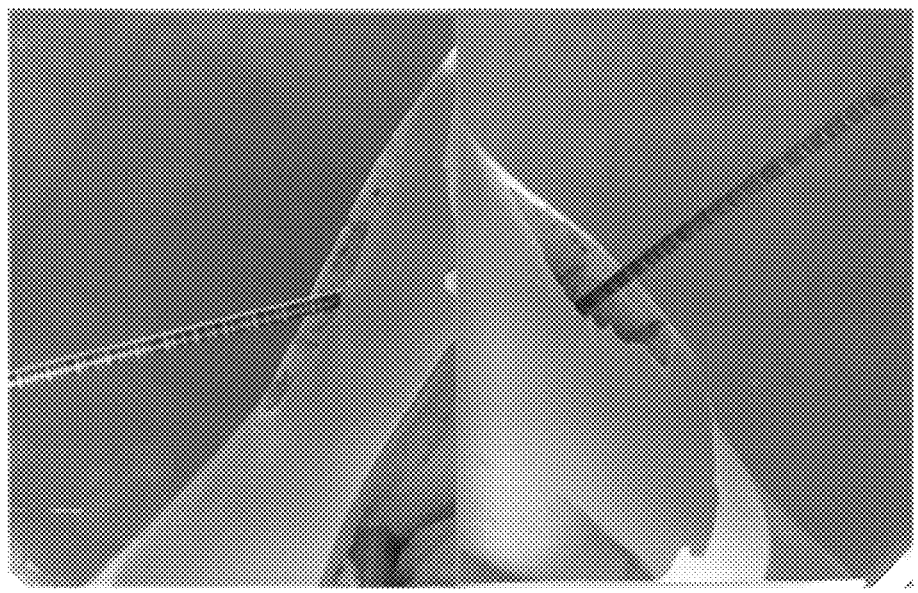
FIG. 5 provides sample in ages seen by the camera, which observes mirrors below the base.

In order to place the wire in the correct position in the simulated radiograph, it is necessary to determine the wire's position relative to the plastic bone. The wire position is calculated by comparing the images from the two mirrors below the base, a sample of which is, shown in FIG. 5. The image processing algorithm finds the position of the wire in each image and then works out the three dimensional axis that the wire lies along relative to the plastic bone. The depth of the wire is estimated by observing the pattern of marks on the wire that work somewhat like a bar code to uniquely identify the position along the wire. This code may be written in a MATLAB script Or other scripting or programming language including C, C++, C#, Python, Java, or other language. Accuracy within a few degrees and a few millimeters has been obtained, however, this may be further improved through modifications to the mechanical structure, different cameras and lenses (including cameras with higher resolution), the image processing algorithms used, and/or the calibration procedure.

Various image processing algorithms may be used for example, where image segmentation is used to determine region boundaries in an image various methods may be used including progressive methods, automatic thresholding, edge-based methods, and morphology-based methods. Where edge detection is used to identify object boundaries in an image various algorithms may be used such as the Sobel, Prewitt, Roberts, Canny, and Laplacian or Gaussian methods. In addition, various forms of image registration may be used such as control-point image registration, or feature-based image registration.

Figure 6:
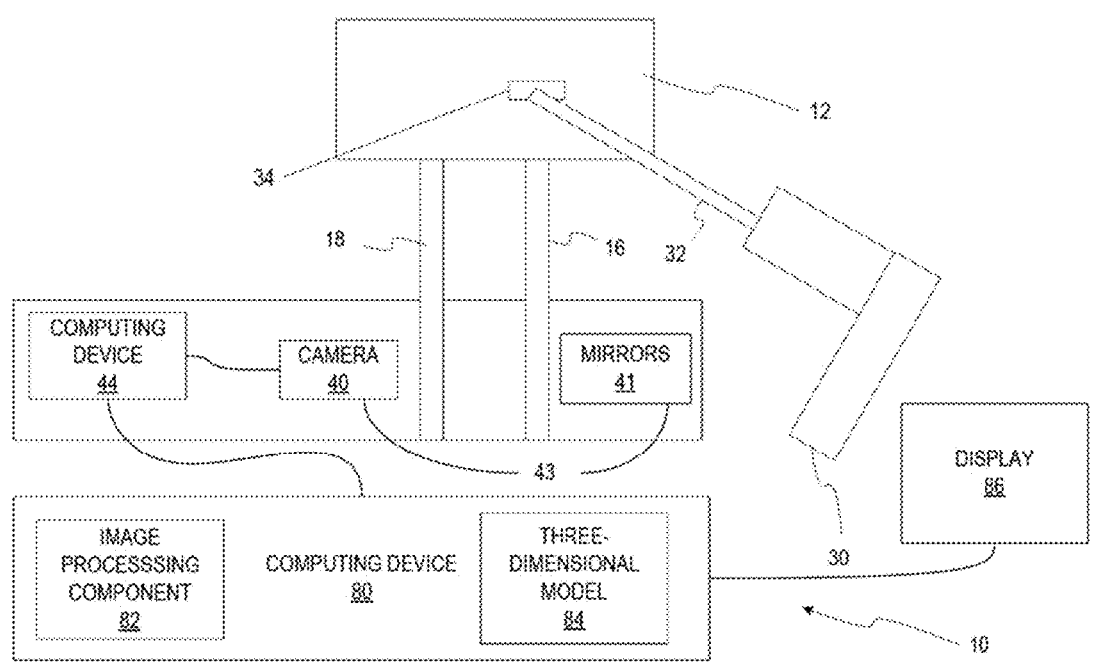
FIG. 6 is a block diagram showing an example of the simulator in use.

FIG. 6 is a block diagram illustrating another example of the surgical simulator 10 with a block 12 with an incision or opening 34. As shown, the block 12 is supported on stands or posts 16, 18, although more of fewer may be used. Of course the stands or posts shown are merely one example of a connector which may be used, any number of other types of connectors may also be used. Disposed within a housing of the device is a camera 40, mirrors 41, and a computing device 44. The mirrors 41 are oriented relative to the camera 40 and the block 12 in order to provide multiple views of the surgical wire 32 within the incision from or opening 34 from underneath to the camera 40. As previously explained, the optical system 43 may include at least one camera 40 and the mirrors 41. The computing device 44 may be operatively connected to another computing device 80. The connection may be an Ethernet network connection or other type of wired or wireless connection. The computing device 80 may include an image processing component or software stored on a non-transitory computer readable storage medium. In addition the computing device 80 may include a three-dimensional model 84 stored on a computer readable storage medium as well. In operation, the computing device 80 may take images acquired from the camera 40 and process those images to determine the three-dimensional position of the surgical wire 32 such as by executing an edge detection algorithm to detect the edges of the surgical wire and identifying fiducial markers on the surgical wire 32 in order to determine its depth. As previously explained, multiple images are acquired so that an exact three-dimensional position may be determined. In addition, note that only a single camera 40 need be used because the use of the mirrors 41 allows multiple views to be acquired without the need for multiple cameras. It is contemplated that in some embodiments the optical system may have additional cameras. Once the three-dimensional position of the surgical wire 32 is known, an image representation of the surgical wire may be projected onto a visual representation of the three-dimensional model. The three-dimensional model including the image representation of the surgical wire may then be displayed on the display 86 so that the trainee sees an image such as that shown in FIG. 3 or FIG. 4. The process preferably occurs in real-time or near real-time. It is noted that although two separate computing devices are shown, functionality of these devices may be combined into a single computing device or alternatively functionality may be spread out across multiple computing devices.

Figure 7:
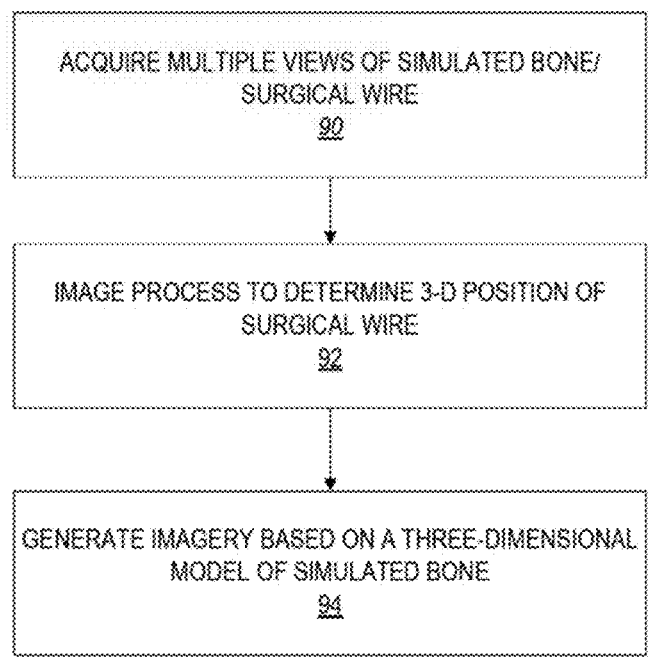
FIG. 7 is a diagram illustrating one example of a methodology.

FIG. 7 is a diagram showing one overview a methodology. In step 90, multiple views of simulated bone and a surgical wire are acquired. Note that where mirrors are used, only a single camera needs to be used in order to acquire multiple views. Next in step 92, the views are image processed in order to determine a 3-D position of the surgical wire relative to the simulated bone. Then in step 94, imagery is generated based on a three-dimensional model of the simulated bone. The imagery may simulate the fluoroscope images that a surgeon would normally see in surgery.

Figure 8:
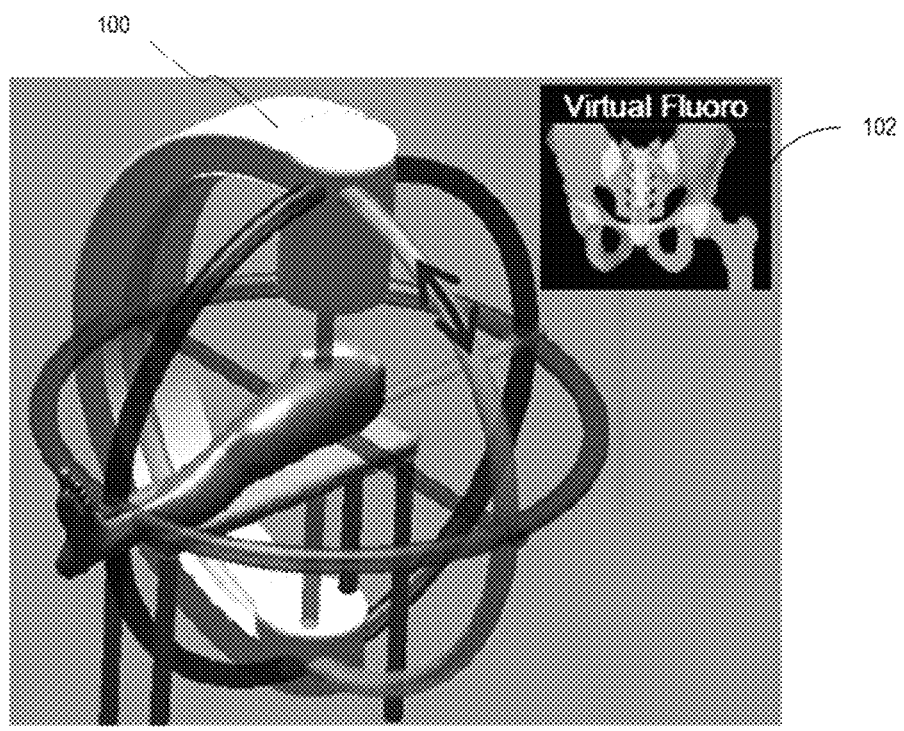
FIG. 8 illustrates a screen display of an interactive fluoroscopic view selection tool.

FIG. 8 is a screen display showing an interactive fluoroscopic view selection tool which provides for showing a C-arm 100 and its position and a corresponding virtual fluoroscopic view 102. To facilitate learning of the task of directing the fluoroscope in order to capture images from perspectives that enable reliable surgical decisions, the simulator may include a fluoroscope position simulator in addition to the wire navigation simulator. The wire navigation simulator may accurately map motions of the learner to the virtual fluoroscope images. Including the fluoroscopic view selection tool helps surgeons or students to recognize the effect of the C-arm 100 position on the imagery they use to guide the wires. The skill that surgeons learn with this is both how to ask for the position to be adjusted and the degree of influence that different imperfections in the desired angle can have on the ultimate position of the wire, how imprecision in the imaging setup can affect their ability to precisely place the wire. Thus, the wire navigation simulator may be used alone or in combination with the fluoroscope position simulator or other types of simulators.

Another potential advantage of the surgical simulator described herein is the low cost of replaceable inserts as well as the overall low cost for a device. In addition multiple different blocks may be used provided the surgical simulator is properly configured for them. For example, an appropriate geometric model of the cadaveric bone may be loaded into the simulator, the position of the bone may be accurately measured and fixed relative to the device. The position of the geometric model of the bone should accurately represent the position of the fixed bone relative to the cameras.

It is noted that the "bone" used need not be a simulated bone but may instead be a cadaveric bone. Where a cadaveric bone is used, the simulator should be appropriately calibrated. This may be performed by scanning the cadaveric bone to provide the appropriate three-dimensional model of the cadaveric bone and then through appropriate positioning of the cadaveric bone to allow for proper registration of the model to the bone.

In addition, although benefits may be achieved by using an optical system which includes a single camera and multiple mirrors in order to provide multiple views, instead of using a single camera, multiple cameras may be used to produce multiple views. Thus, it is to be understood that multiple cameras may be used. Whether provided through multiple cameras or through additional mirrors, more than two views may be provided. Thus, a third view, a fourth view, and/or additional views may also be provided.

The simulator may be used for other purposes as well. For example, the simulator may be used by orthopaedic implant companies or others to demonstrate their devices to surgeons at conferences, during visits, or otherwise so the surgeons can try out how the implant would work in practice.

Therefore a surgical simulator and related methods have been shown and described. Although specific details have been provided herein, the surgical simulator contemplates numerous additions, variations, and alternatives. These include differences in materials, differences in algorithms used, differences in relative placement of component parts, and any number of other additions, variations, and alternatives.

What is claimed is:

1. An orthopaedic surgical simulator, comprising
a bone, wherein the bone is a simulated bone or a cadaver bone;
a base, wherein the bone is operatively connected to the base;
an optical system mounted proximate the base, wherein the optical system comprises at least one camera and provides a first view and a second view of an incision area associated with the bone;
fiducial markers on a surgical wire to represent depth of the surgical wire when a tip of the surgical wire is not visible; and
a computing device in operative communication with the camera and configured to track position of a surgical wire by determining position of the surgical wire using the fiducial markers on the surgical wire and to generate imagery based on a three-dimensional model of the bone and position of the surgical wire relative to the bone.

2. The orthopaedic surgical simulator of claim 1 wherein the bone is simulated bone formed from a hard plastic material shaped to contain landmarks associated with the bone.

3. The orthopaedic surgical simulator of claim further comprising material simulating skin surrounding the bone.

4. The orthopaedic surgical simulator of claim 3 wherein the material surrounding the bone comprises an elastomer.

5. The orthopaedic surgical simulator of claim wherein the fiducial markers comprise a plurality of markings on the surgical wire.

6. The orthopaedic surgical simulator of claim wherein the markings are rotationally symmetric about the wire.

7. The orthopaedic surgical simulator of claim 1 wherein the position of the surgical wire is a three-dimensional position.

8. The orthopaedic surgical simulator of claim 1 further comprising at least one connector operatively connecting the bone to the base.

9. The orthopaedic surgical simulator of claim 1 further comprising a work surface, the work surface operatively connected to the base below the bone and above the camera.

10. A method comprising:
providing an orthopaedic surgical simulator, comprising:
a bone wherein the bone is a simulated bone or cadaver bone;
a base, the bone operatively connected to the base;
an optical system comprising a camera mounted proximate the base, the optical system providing a first view and a second view of an incision area associated with the simulated bone;
fiducial markers on a surgical wire to represent depth of the surgical wire when a tip of the surgical wire is not visible; and
a computing device in operative communication with the camera and configured to track position of a surgical wire and determine position of the surgical wire using the fiducial markers on the surgical wire and to generate imagery based on a three-dimensional model of the bone and position of the surgical wire relative to the bone;
acquiring the first view and the second view;
processing an image representation of the first view and the second view to determine three-dimensional position of the surgical wire; and
generating imagery based on the three-dimensional model of the bone and the position of the surgical wire relative to the simulated bone.

11. The method of claim 10 wherein the bone is formed from a hard plastic material shaped to contain landmarks associated with the bone and wherein the material is surrounding the bone comprises an elastomer.

12. The method of claim 10 wherein the fiducial markers comprise a plurality of annular markings on the surgical wire.

13. The method of claim 10 wherein the position of the surgical wire is a three-dimensional position.

14. The method of claim 10 wherein the orthopaedic surgical simulator further comprises a work surface, the work surface operatively connected to the base below the bone and above the camera.

15. The method of claim 10 wherein the method is performed to train a surgeon or surgical student.

16. The method of claim 10 further comprising replacing the bone.

17. The method of claim 10 further comprising providing an orthopaedic implant.

18. The method of claim 10 wherein the bone comprises an orthopaedic implant.

19. A method of demonstrating an orthopaedic implant using an orthopaedic surgical simulator, comprising:
providing the orthopaedic surgical simulator, the simulator comprising:
an optical system comprising a camera mounted proximate the base, the optical system providing a first view and a second view of an incision area to access a bone;
fiducial markers on a surgical wire to represent depth of the surgical wire when a tip of the surgical wire is not visible; and
a computing device in operative communication with the camera and configured to track position of a surgical wire and determine position of the surgical wire using the fiducial markers on the surgical wire and to generate imagery based on a three-dimensional model of the bone and position of the surgical wire relative to the bone;
acquiring the first view and the second view;
processing an image representation of the first view and the second view to determine three-dimensional position of the surgical wire; and
generating imagery based on the three-dimensional model of the bone and the position of the surgical wire relative to the simulated bone.

20. The method of claim 19 wherein the generating the imagery is further based on a three-dimensional model of an implant.

* * * * *